United States Patent [19]

Horstman et al.

[11] Patent Number: 4,742,760
[45] Date of Patent: May 10, 1988

[54] AIRCRAFT CABIN VENTILATION SYSTEM

[75] Inventors: Raymond H. Horstman, Auburn; Damian G. Monda, Seattle; Douglas E. Peash, Enumclaw; Arthur S. Yorozu, Seattle, all of Wash.

[73] Assignee: The Boeing Company, Seattle, Wash.

[21] Appl. No.: 70,334

[22] Filed: Jul. 6, 1987

[51] Int. Cl.⁴ ............................................. B64D 13/00
[52] U.S. Cl. ............................................. 98/1; 98/1.5; 98/10; 98/34.5; 244/118.5
[58] Field of Search ............... 98/1, 1.5, 2, 2.15, 98/5, 10, 34.5, 34.6; 137/849.2; 244/118.5; 165/15, 16

[56] References Cited

U.S. PATENT DOCUMENTS

| | | | |
|---|---|---|---|
| Re. 23,913 | 12/1954 | Baak | 98/1.5 |
| 2,004,927 | 6/1935 | Bulkeley | 98/34.6 |
| 2,171,622 | 9/1939 | Calkins | 98/10 X |
| 2,172,944 | 9/1939 | Norris | 98/10 X |
| 2,200,992 | 5/1940 | Lintern | 98/2 |
| 2,203,814 | 6/1940 | Clements | 98/10 X |
| 2,264,637 | 12/1941 | Landell | 98/10 X |
| 2,268,502 | 12/1941 | Browne | 98/10 |
| 2,316,237 | 4/1943 | Grunert et al. | |
| 2,496,862 | 2/1950 | DelMar | 98/1.5 |
| 2,519,109 | 8/1950 | Callender | 98/10 X |
| 2,651,250 | 9/1953 | Marquardt | 98/10 X |
| 2,666,497 | 1/1954 | Weber | |
| 2,775,185 | 12/1956 | Ahrens | 98/10 X |
| 2,987,980 | 6/1961 | Winn | 98/2.15 |
| 3,059,561 | 10/1962 | Wilfert | 98/2 |
| 3,421,290 | 1/1969 | Cheney et al. | 55/101 |
| 3,777,648 | 12/1973 | McGowan et al. | 98/2.04 |
| 4,062,273 | 12/1977 | O'Connor | 98/10 |
| 4,252,053 | 2/1981 | Muto et al. | 98/2.15 |
| 4,412,425 | 11/1983 | Fukami et al. | 62/244 |

FOREIGN PATENT DOCUMENTS 2447453 4/1976 Fed. Rep. of Germany .
2803624 8/1979 Fed. Rep. of Germany ....... 98/2.18

Primary Examiner—Harold Joyce
Attorney, Agent, or Firm—Christensen, O'Connor, Johnson & Kindness

[57] ABSTRACT

A ventilation system for clearing gaseous and particulate contaminants such as cigarette smoke and metabolic exhalants from an aircraft cabin. The ventilation system is disclosed in two embodiments, the first having an overhead discharge duct (84) through which supply air is provided to the interior of the cabin (12) and discharge nozzles (78) disposed adjacent the lower portion of the inwardly extending end of storage bins (20) through which supply air is discharged toward the sidewalls (14) of the cabin. Air is exhausted from the cabin through exhaust air ducts (40) disposed immediately below the point where the storage bins attach to the sidewalls. In addition, air is recirculated from the cabin through recirculation air ducts (30) disposed adjacent the floor of the cabin. Relatively contaminated air is thus swept by the supply airflow directly into the exhaust air ducts for venting outside the aircraft, while cleaner air is recirculated back to the supply air ducts for ventilation of the cabin. In a second embodiment, the supply air is provided through discharge ducts (177) disposed immediately above the overhead storage bins (120) and contaminated air is exhausted through an exhaust slot (141) disposed on the lower surface of the storage bins. In each embodiment, the contaminated air is swept immediately into the exhaust duct without significant recirculation and mixing with the air that is returned to ventilate the cabin.

22 Claims, 3 Drawing Sheets

AIRCRAFT CABIN VENTILATION SYSTEM

TECHNICAL FIELD

This invention generally relates to a ventilation system for an aircraft cabin, and specifically, to a ventilation system including overhead supply air nozzles through which ventilation air is supplied to the cabin, exhaust air ducts through which air is exhausted from the cabin and vented overboard, and return air ducts through which air is removed from the cabin and returned as a portion of the ventilating air supply.

BACKGROUND INFORMATION

Concern has grown in the airline industry about the potential for harm to nonsmoking airline passengers and crew members who are forced to breathe air contaminated with possibly carcinogenic byproducts of cigarette smoking. Accordingly, it has become increasingly important to develop an aircraft cabin ventilation system that exhausts air heavily contaminated with smoke and other exhalants to avoid circulating the contaminated air into the supply airstream where it may affect other passengers and the crew of the aircraft.

An aircraft cabin comprises a sealed, pressurized chamber. As air is vented overboard both intentionally and from small leaks at doors and at other points, fresh air is compressed, temperature conditioned and mixed with recirculated air as necessary for proper ventilation and maintenance of cabin pressure. In prior aircraft ventilation systems, air is drawn from various points within the cabin and recirculated as if the cabin comprised but a single uniformly contaminated zone. Because the source of smoke and most other exhalant contaminants in an aircraft cabin is the passengers who are seated in the cabin, and because the concentration of these contaminants is much greater at and above the heads of the passengers, viewing the aircraft cabin as a single zone is inaccurate. Since most passenger aircraft are provided with an overhead shelf or storage bin, the lower surface of this shelf tends to delineate the upper boundary of an upper zone that is most heavily contaminated with smoke and exhalants. Conversely, because the concentration of these contaminants in air adjacent the floor of the cabin is much less, the floor of the cabin space defines the lower boundary of a lower zone. In prior aircraft ventilation systems, air drawn from the more heavily contaminated upper zone is mixed with cleaner air drawn from the less contaminated lower zone, and a portion of the mixed air is vented overboard while the majority of the mixed contaminated air is recirculated back into the supply airstream. Thus, the prior ventilation systems succeed in contaminating all the air in the aircraft.

SUMMARY OF THE INVENTION

The present invention is directed to solving the above problem and provides a ventilation system for use in an aircraft cabin that can be divided into a first zone and a second zone. The uppe ezone is disposed below an overhead shelf and is characterized as having a relatively greater concentration of gaseous and particulate contaminants than is air in the lower zone. The ventilation system reduces the concentration of gaseous and particulate contaminants in the cabin while maintaining a stable ventilation airflow at a velocity unlikely to create discomfort to occupants in the cabin due to drafts. Included in the ventilation system are an exhaust duct disposed below the overhead shelf and adjacent the upper zone, through which air is drawn from the upper zone and vented outside the aircraft. In addition, a fan is provided to draw air from the lower zone through an opening disposed proximate a floor of the cabin, which is in fluid communication with a suction port on the fan. The discharge port of the fan is connected in fluid communication with a discharge nozzle that is disposed proximate the ceiling of the cabin. The discharge nozzle is provided with a mixture of pressurized fresh air and air that has been drawn from the lower zone and is operative to direct that mixture of air into the cabin, creating a circulating airflow downwardly into the lower zone. This system further includes means for circulating the air in the upper zone toward the exhaust duct through which air from the upper zone is withdrawn from the cabin, creating a circulating airflow downwardly into the lower zone. This system further includes means for circulating the air in the upper zone toward the exhaust duct through which air from the upper zone is withdrawn from the cabin. The resulting airflow through the cabin sweeps the contaminated air from the upper zone into the exhaust duct with little or no mixing between the supply air and the contaminated air, provides an adequate air supply to the passengers in the cabin as required for ventilation and to maintain cabin pressure, and can be adjusted to accomplish the preceding without creating an airflow velocity that would cause the passengers to feel discomfort due to drafts. The present invention prevents carbon dioxide build-up in the cabin, and provides a degree of cabin ventilation that in prior art systems could only be achieved by introducing a large volume of fresh pressurized air, with concomitant excessive energy consumption.

In a first embodiment of the ventilation system, supply air is discharged into the cabin from a discharge duct located in the center of the ceiling, and from discharge ducts disposed adjacent an inwardly extending edge of the overhead shelf.

In a second embodiment, the present ventilation system includes a discharge nozzle disposed above the overhead shelf and oriented to direct the supply air into the cabin downwardly over a surface of the shelf. The advantages of the two embodiments over prior ventilation systems will be apparent in view of the attached drawings and the disclosure of the preferred embodiment which follows hereinbelow.

DISCLOSURE OF THE PREFERRED EMBODIMENT

Figure 1:
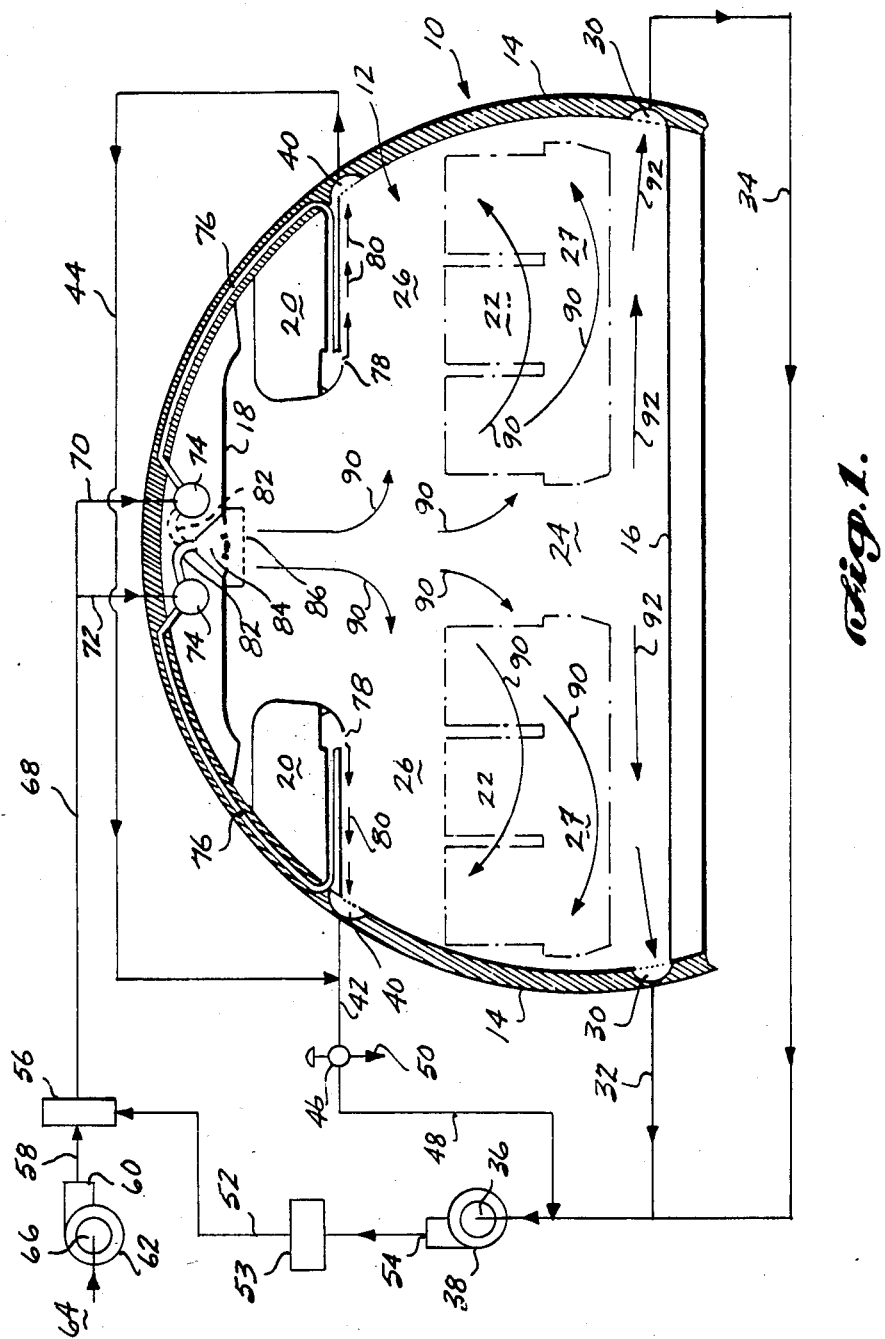
FIG. 1 is a partially cut-away, cross-sectional view of an aircraft fuselage showing a cabin to which a first embodiment of the present invention is applied, and schematically representing the supply, exhaust and return airflow paths.

Referring to FIG. 1, a first embodiment of the present invention is shown installed in an aircraft fuselage generally represented by reference numeral 10. A cabin 12 of the aircraft includes curved sidewalls 14 on each side, joined by a floor 16. The area of the aircraft below the floor is not shown since it is not particularly important with regard to airflow within cabin 12.

The top portion of cabin 12 is defined by a ceiling panel 18. Immediately below ceiling panel 18 are disposed storage bins 20, which extend into cabin 12 from each sidewall 14. Storage bins 20 are thus disposed immediately above seating areas 22 at opposite sides of a center aisle 24. The space immediately above seating area 22 and below storage bin 20 comprises an upper zone 26 in which smoke and other exhalant contaminants produced by passengers seated within seating areas 22 is likely to be concentrated. An object of the present invention is to provide a ventilation system which is capable of sweeping the contaminated air from the upper zone 26, preventing it from mixing with the rest of the air in cabin 12 and with the supply air that is recirculated back through the ventilation system.

A lower zone 27 in cabin 12 is generally defined by floor 16 and the lower portion of seating areas. Air is drawn from the lower zone through floor return air ducts 30 at each side of the cabin. As viewed in FIG. 1, air exiting cabin 12 through the left return air duct 30 passes through a return air line 32 and mixes with air exiting through the return air duct 30 disposed on the opposite sidewall 14, which flows through return air line 34. The return airflow from return air ducts 30 is drawn into a suction port 36 of a return air fan 38 from which it is discharged for resupply to the cabin as will presently be described.

In addition, air is drawn from cabin 12 through exhaust ducts 40 which are disposed at each side of the cabin, immediately below the point where overhead storage bins 20 adjoin sidewalls 14. Again, relative to the view in FIG. 1, air drawn from the left exhaust duct 40 passes through exhaust air line 42 and combines with air drawn from the exhaust duct 40 disposed on the opposite sidewall 14, after passing through exhaust air line 44. A portion of the air drawn from the cabin through exhaust ducts 40 may be recirculated into suction port 36 of recirculating fan 38. However, a substantial portion of the air passing through exhaust ducts 40 is vented overboard through a three-way valve 46, into the outdoor ambient 50. To the extent that contaminated air in first zone 26 is vented overboard, the smoke and other exhalants contained within that air are not recirculated into the ventilation air supplied to cabin 12.

Although it may be preferable to vent all of the air drawn through exhaust ducts 40, it may be necessary to recirculate a portion of that air to maintain the cabin pressure at its required level. It should also be noted that none of the air drawn from the lower zone 27 which is relativly free of contamination from smoke and other exhalant pollutants, is vented outside the aircraft to ambient 50. Instead, this air is entirely recirculated into suction port 36 of recirculation fan 38. The discharge air from fan 38 passes through a return air line 52 and a filter 53 into a mixing box 56 after exiting fan discharge port 54. A second input to mixing box 56 is provided through fresh air supply line 58 which is connected to the discharge port 60 of air pack 62.

Although shown as simply a centrifugal fan in FIG. 1, air pack 62 comprises a compressor and temperature conditioning system as will be well known to those of ordinary skill in the aircraft ventilation systems art. Air pack 62 draws fresh air from the outdoor ambient 64 into a suction port 66, compresses it, temperature conditions the air, and provides it to mixing box 56 through supply air line 58, where it is mixed with the filtered return air provided through return air line 52. The mixed fresh and return air passes from mixing box 56 through a supply air line 68 which splits into separate supply air lines 70 and 72 to provide supply air to supply air plenums 74 disposed above ceiling 18.

Supply air from supply air plenums 74 travels downwardly through passages 76 which extend below the interior portion of overhead storage bins 20 to discharge nozzles 78 which are disposed below the inwardly extending ends of the storage bins. Supply air exiting discharge nozzles 78 is directed as shown by arrows 80 laterally across the upper portion of upper zone 26 toward the sidewalls 14 and, more specifically, toward exhaust ducts 40. The flow of air from discharge nozzles 78 thus tends to sweep across the upper portion of the upper zone 26, entraining air that is contaminated with smoke and other exhalant pollutants, and moving that air toward the exhaust ducts 40.

Supply air is also conveyed from supply air plenums 74 through supply air lines 82 to a supply air duct 84 disposed in the center of ceiling 18, immediately above aisle 24. In the first preferred embodiment, supply air duct 84 is covered by a diffuser panel 86 that breaks up directional airflow from a discharge nozzle (not shown in detail) comprising a lower portion of supply air duct 84. Diffuser panel 86 tends to diffuse the airflow pattern without unduly reducing the volumetric flow of air into cabin 12 from supply air duct 84, and may comprise a pluarality of relatively small orifices, a screen or other similar diffusion panel. Alternatively, a diffusion nozzle could be incorporated into supply air duct 84. Air flowing out from supply air duct 84 flows generally downwardly into aisle 24 and is drawn laterally outwardly therefrom toward sidewalls 14, as shown by arrows 90. The supply airflow thus tends to sweep through the seating area 22, carrying contaminated air in upper zone 26 toward exhaust ducts 40. Adjacent floor 16, the supply airflow follows a flow path as generally indicated by arrows 92 and sweeps through the lower zone 27 adjacent floor 16, following a flow path as generally indicated by arrows 92, toward return air ducts 30. The importance of the airflow patterns represented by arrows 90 and 92 and the manner in which the airflow pattern is affected by the relative velocities and directionality of air entering cabin 12 from supply air ducts 84 and from nozzles 78 is illustrated in FIGS. 3-6 and discussed below.

Figure 2:
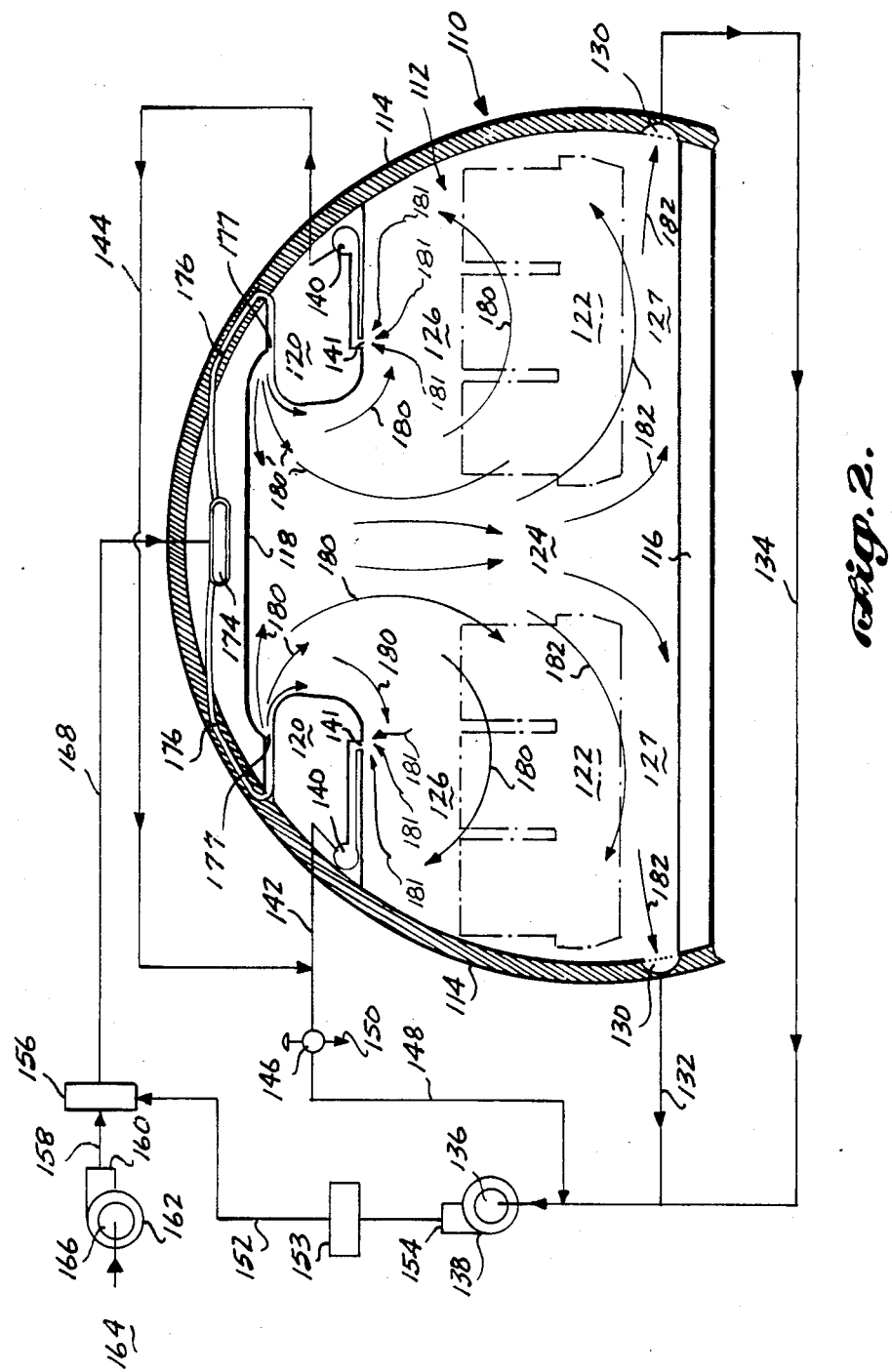
FIG. 2 is a partially cut-away, cross-sectional view of an aircraft fuselage equipped with a second embodiment of the present invention, showing the supply, return and exhaust airflow paths in a schematic fashion.

A second embodiment of the present invention is illustrated in FIG. 2, applied to an aircraft fuselage generally denoted by reference numeral 110. To simplify the explanation and to emphasize the similarities between the first and second embodments, reference numbers associated with the second embodiment are 100 greater than the numbers associated with similar elements previously associated with the first embodiment. For example, in the first embodiment, the cabin is indicated by reference numeral 12, while in the second embodiment, the cabin is identified by reference numeral 112. The differences in the structure and function of the correspondingly numbered elements is explained in the following discussion, as appropriate.

Cabin 112 includes sidewalls 114, a floor 116 and a ceiling 118. Overhead storage bins 120 are disposed on each side of cabin 112, extending inwardly from sidewalls 114. Seating areas 122 are disposed immediately below storage bins 120 at each side of a center aisle 124. An upper zone 126 is defined between seating areas 122 and overhead storage bins 120; a lower zone 127 having a relatively lower contamination of smoke and other exhalants is disposed below the first zone, adjacent floor 116.

Return air is exhausted from cabin 112 through return air ducts 130, which are disposed at the sides of the cabin immediately above floor 116, and passes therefrom into return air lines 132 and 134. In addition, air is drawn from upper zone 126 into exhaust air slots 141, which are disposed on the lower surface of overhead storage bins 120, and each exhaust air slot comprises a longitudinally extending opening. Air drawn through exhaust air slots 141 enters overhead exhaust ducts 140 and passes through exhaust air lines 142 and 144 to a three-way valve 146. A substantial portion of the contaminated air from upper zone 126 is vented overboard to outdoor ambient 150 through a three-way valve 146, the remainder being recirculated through a return air line 148 to a suction port 136 on a fan 138. The requirements for maintenance of cabin pressure dictate the portion of the contaminated air that may be vented, as was explained for the first embodiment. Air discharge from fan 138 through a discharge port 145 passes through a return air line 152 and a filter 153 to a mixer box 156, where it is mixed with fresh air provided through a fresh air supply line 158 from air pack 162. The functions of air pack 162 are as previously explained for air pack 62.

Fresh air from outdoor ambient 164 is drawn into air pack 162, compressed and mixed in mixer box 156 with the return air provided through return air line 152. The resultant supply air passes through a supply air line 168 to a supply air plenum 174. Supply air from plenum 174 travels downwardly through each of supply air passages 176 and is discharged into cabin 112 through supply air discharge nozzles 177 that are disposed above storage bins 120. Air discharged through nozzles 177 attached to an adjacent surface in accordance with the Coanda Effect, and thus tends to follow the downwardly curving surface of storage bins 120, flowing downwardly into center aisle 124 of cabin 112.

The direction of the supply airflow from discharge nozzles 177 is generally indicatd by arrows 180. As shown in FIG. 2, supply air following the flow path indicated by arrows 180 spreads outwardly from center aisle 124 toward sidewalls 114, sweeping laterally through the upper zone 126 and upwardly (as shown by arrows 181) into exhaust air slots 141. The contaminated air in upper zone 126 is thereby swept from cabin 112 directly into exhaust air ducts 140 so that it may be vented into outdoor ambient 150 through three-way valve 146, as previously explained. Supply air flowing downwardly into aisle 124 also reaches the lower zone, and following the path of arrows 182, is exhausted from the cabin through return air ducts 130. Substantially all the relatively uncontaminated air exhausted from cabin 112 through ducts 130 is recirculated back into the cabin through supply air plenum 174.

In both embodiments, the first shown in FIG. 1 and the second in FIG. 2, it will be apparent that very little of the contaminated air in the upper zones 26 and 126 is caused to circulate around inside the cabins where it may be drawn through return air ducts 30 and 130 for recirculation into the supply airstream. In fact, over 40 percent of the metabolic carbon dioxide generated by passengers in seating areas 22 and 122 is immediately vented from the cabin. In addition, both embodiments provide for recirculation of virtually all the air passing through the relatively uncontaminated lower zone which is disposed adjacent floors 16 and 116.

The airflow patterns that are achieved as shown in FIGS. 1 and 2 depend on a number of parameters related to the direction of airflow and the relative velocities of supply air provided to cabins 12 and 112. For example, in FIG. 2, it is extremely important that supply air provided cabin 112 through dischrge nozzle 177 have sufficient velocity to follow the downwardly extending surface of overhead storage bins 120 rather than attaching to ceiling 118. However, it is also important that the velocity of the supply airflow through discharge nozzles 177 not exceed a level which is likely to cause passengers in passenger seating areas 122 to experience drafty conditions. It has been determined that most people are comforatable if: (a) the average velocity of the airflow in their environment is less than 50 feet/minute, and (b) the maximum velocity is less than 65 feet/minute. In accordance with the present invention, air is supplied to the cabin with a range of velocities that meets these criteria.

With regard to the first embodiment illustrated in FIG. 1, the criticality of airflow from diffuser 86 and discharge nozzles 78 and the problems associated with directivity of air discharge from supply air duct 84 may be better understod by reference to FIGS. 3–6. These figures illustrate schematically the airflow problems which may result from various conditions wherein the directivity and the relative velocities of supply air discharged into an aircraft cabin are not properly controlled.

Figure 3:
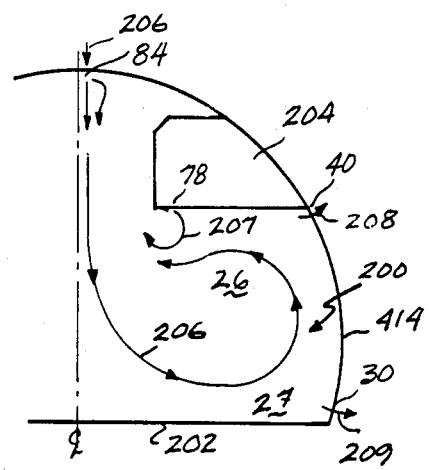
FIG. 3 schematically illustrates the direction of airflow in one-half of the cabin for the first embodiment, wherein the supply air velocity from a center discharge port is too high.

In FIG. 3, a cabin 200 having a floor 202 and an overhead storage bin 204 is provided with a supply airflow from an overhead supply air duct 84. Duct 84 is not provided with a diffuser panel 86. Instead, supply air duct 84 is provided with a generally conventional type discharge nozzle (not shown), which directs airflow generally downwardly and outwardly of a vertical plane extending through the cabin. As can be seen in FIG. 3, supply airflow 106 flows downwardly from duct 84 center towards floor 202 and curves around and back toward the center of the cabin. This condition results if supply air through duct 84 has excessive velocity and directionality, as compared to the velocity of supply airflow 207 which enters cabin 200 from discharge nozzle 78. It will be apparent that the supply airflow 206 will tend to mix with contaminated air in zone 26 rather than sweeping the contaminated air from the cabin. The mixing action spreads the contaminated air throughout cabin 200 so that it is carried to return air duct 30 for recirculation back to the supply air duct as shown by arrow 209. Air vented from the cabin at exhaust air duct 40 as shown by arrow 208 is thus a mixture of air from first zone 26 and from the rest of cabin 200 and is not swept from the cabin by the supply airflow from nozzles 78 indicated by arrow 207, as disclosed previously. The apparent solution to this problem is to increase the velocity of airflow through discharge nozzle 78 and/or to decrease the velocity of airflow through supply air duct 84.

Figure 4:
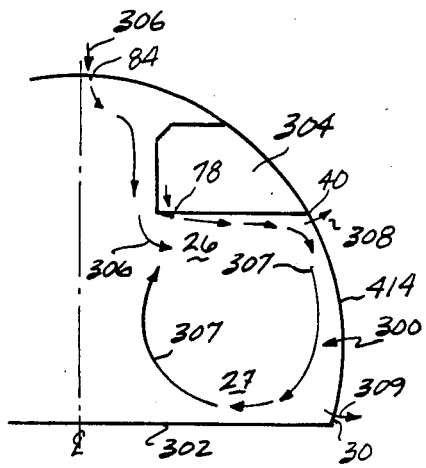
FIG. 4 illustrates an airflow pattern in the cabin for the first embodiment of the present invention, wherein the supply airflow from a discharge nozzle disposed below an overhead shelf has an excessive velocity.

Conversely, as shown in FIG. 4, if the velocity of supply air discharged from discharge nozzle 78 is excessive relative to the velocity of air discharged from supply air duct 84, supply air entering a cabin 300 from discharge nozzle 78 will follow a flow path 307, tending to carry contaminated air from upper zone 26 past exhaust duct 40, and allowing only a small portion of the contaminated air to be vented through exhaust duct 40, as shown by arrow 308. Instead, most of the contaminated air is circulated downwardly into the lower zone 27 adjacent floor 302 and then upwardly so that it mixes with the supply air flowing in through supply air duct 84 along flow path 306. Contaminated air is thus spread throughout cabin 300 and is recirculated after it is drawn through ducts 30 as shown by arrows 309. In this instance, an apparent solution to the problem is to reduce the velocity of air flowing from discharge nozzle 78.

Figure 5:
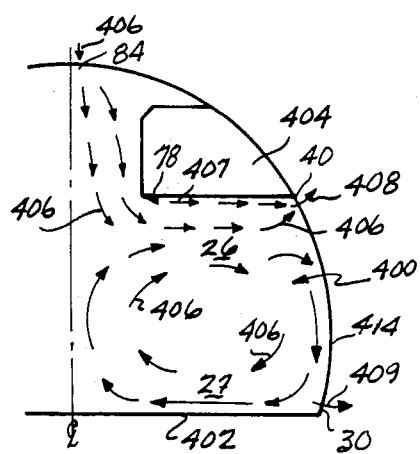
FIG. 5 illustrates schematically the airflow pattern in the cabin for the first embodiment wherein the supply air discharged from a center discharge port is not properly diffused.

As shown in FIG. 5, a cabin 400 has a supply airflow 406 entering at supply air duct 84, which tends to carry contaminated smoke laden air from upper zone 26 downwardly toward floor 402 and upwardly, back around toward sidewall 414. Supply airflow 406 is provided through duct 84 without benefit of a diffuser 86, and therefore has a substantial directivity associated with it which interferes with sweeping the contaminated air from upper zone 26 laterally outward toward exhaust duct 40. Supply air discharged from exhaust nozzle 78 continues to provide an airflow path 407 toward exhaust ducts 40; however, the highly directive airflow from the diffused supply air duct 84 causes a substantial portion of that contaminated air to circulate within cabin 400, mixing with air that is exhausted through duct 30 as shown by arrow 409.

Figure 6:
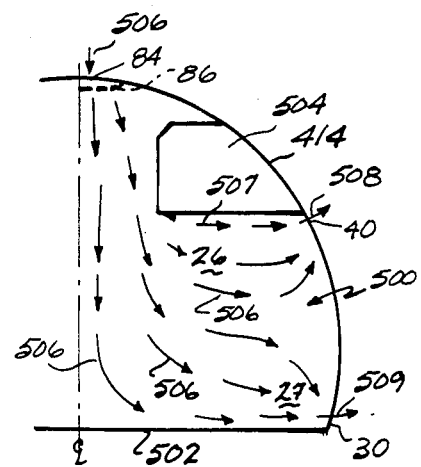
FIG. 6 shows an acceptable cabin airflow pattern for the first embodiment.

The desired circulation path for sweeping contaminants from upper zone 26 is shown in FIG. 6, wherein the diffuser 86 is added to supply air duct 84, thereby breaking up the directional airflow which created the problem illustrated in FIG. 5. As shown in FIG. 6, cabin 500 has a supply airflow entering from a supply air duct 84 through the diffuser panel 86 and following the flow path indicated by arrows 506. In addition, supply air is provided through discharge nozzle 78 and flows laterally outward through upper zone 26 as shown by arrows 507. Contaminated air from upper zone 26 is thus swept from cabin 500 flowing out through exhaust ducts 40 as indicated by arrow 508. In addition, supply air from diffuser panel 84 flows downwardly into the lower zone 27 adjacent floor 502 and is drawn out through return air ducts 30, as indicated by arrow 509, without recirculating back up into the upper zone 26. The airflow pattern indicated by arrows 506 in FIG. 6 results from properly allocating supply air through supply air ducts 84 and discharge nozzles 78 to control the relative velocities of airflow into cabin 500. In addition, provision of a diffusion panel 86 (or other means for providing nondirectional airflow into the cabin 500 from supply air duct 84) avoids the problems illustrated in FIG. 5, while providing proper ventilation and maintaining required cabin air pressure.

The second embodiment of the present invention illustrated in FIG. 2 presents a different set of problems related to airflow distributon. Since air is supplied to cabin 112 only through discharge nozzles 177, it is important that the volume of flow be sufficient to provide the required ventilation and cabin pressure. In addition, the velocity of the supply air leaving nozzles 177 must be sufficient to "attach" to the surface of storage bins 120 in accordance with the Coanda Effect to insure that a symmetrical distribution of airflow about a vertical center plane through the cabin is achieved. However, the velocity of the air in cabin 112 would not be so high as to cause passengers seated in areas 122 to experience discomfort due to drafts. One solution to this problem is disclosed in commonly assigned U.S. patent application Ser. No. 046,631, titled, "Dual Nozzle Cabin Ventilation System," filed on May 7, 1987, which in its entirety is hereby incorporated herein by reference.

With regard to the second embodiment of the present invention, exhaust ducts 140 may be eliminated by providing a plenum area above ceiling 118 in fluid communication with slots 141. Contaminated air withdrawn from upper zone 126 through slots 141 would be conveyed to three-way valve 146 and a substantial portion vented overboard, as described above.

Although the present invention has been disclosed with regard to two embodiments, modifications thereto will be apparent to those of ordinary skill in the art within the scope of the claims that follow. However, it is not intended that the invention be limited by the disclosure, but instead that its scope be determined entirely by reference to the claims which follow hereinbelow.

The embodiments of the invention in which an exclusive property or privilege is claimed are defined as follows:

1. In an aircraft cabin that is divided into an upper zone and a lower zone, wherein air in the upper zone is characterized as having a relatively greater concentration of gaseous and particulate contaminants than is air in the lower zone, and wherein the upper zone is disposed below an overhead shelf, a ventilation system for reducing the concentration of gaseous and particulate contaminants in the cabin, comprising:
  (a) means disposed below the overhead shelf and adjacent the upper zone, for drawing air from the upper zone and venting that air outside the aircraft;
  (b) means for drawing air from the lower zone for recirculation back into the aircraft cabin; and
  (c) discharge means, in fluid communication with the means for drawing air from the lower zone and with a source of pressurized fresh air, the air from the lower zone and the fresh air being mixed, for direction said mixed air into the cabin from a location disposed above the upper zone, creating an airflow downwardly into the lower zone, the discharge means including means for urging the air in the upper zone to flow toward the means for drawing air from the upper zone.

2. The ventilation system of claim 1 wherein the discharge means include a discharge nozzle disposed proximate a ceiling of the cabin.

3. The ventilation system of claim 2 wherein the discharge nozzle extends along the longitudinal centerline of the ceiling.

4. The system of claim 2 wherein the means for urging the air in the upper zone to flow toward the means for drawing air from the upper zone include a discharge nozzle disposed adjacent an extending edge of the overhead shelf, through which said mixed air is discharged generally across the upper zone, directed toward the means for drawing air from the upper zone, so that the air having the greater concentration of gaseous and particulate contaminants is swept out of the upper zone and vented outside the aircraft.

5. The ventilation system of claim 2 wherein the discharge nozzle is disposed above the overhead shelf and is oriented to direct said mixed air into the cabin downwardly over a surface of the shelf as a flow attached to said surface.

6. The ventilation system of claim 1 wherein the means for drawing air from the upper zone comprise an opening disposed in a lower surface of the overhead shelf, in fluid communication with a valve through which the air is vented outside the aircraft.

7. The ventilation system of claim 1 wherein the means for drawing air from the upper zone comprise an openign disposed in the wall of the aircraft cabin, proximate a lower surface of the overhead shelf, in fluid communication with a valve through which the air is vented outside the aircraft.

8. The ventilation system of claim 1 wherein the means for drawing air from the lower zone comprise a fan, and an opening disposed proximate a floor of the cabin in fluid communication with a suction port of the fan, a discharge port of the fan being connected in fluid communication with the discharge means.

9. A ventilation system for an aircraft cabin having a storage bin disposed overhead a passenger seating area, comprising:
(a) a first exhaust inlet disposed below the storage bin and above the passenger seating area through which air is drawn from the cabin, and first exhaust inlet being connected to a duct through which air drawn from the cabin at the first exhaust inlet is vented outside the aircraft;
(b) a second exhaust inlet disposed adjacent a floor of the cabin and connected to a recirculation air duct through which air drawn from the cabin in the vicinity of the floor is conveyed;
(c) means connected in fluid communication with the recirculation air duct, for recirculating air drawn from the cabin back into the cabin; and
(d) a supply air duct disposed adjacent a ceiling of the cabin, in fluid communication with a source of fresh pressurized air and with the recirculation air duct, the air drawn from the cabin through the second exhaust inlet and the fresh pressurized air comprising ventilation air, the supply air duct being operative to convey the ventilation air and to discharge it into the cabin through a plurality of outlets, the ventilation air discharged from the supply air duct flowing downwardly into the cabin with minimal recirculation and mixing therein, in part being drawn into the second exhaust inlet for recirculation back to the supply air duct and in part being drawn into the first exhaust inlet for venting outside the aircraft.

10. The ventilation system of claim 9, wherein the air drawn into the first exhaust inlet and vented outside the aircraft is relatively much more contaminated with contaminants and with cigarette smoke and other exhalants than is the air drawn into the second exhaust inlet for recirculation back into the cabin.

11. The ventilation system of claim 9, wherein the outlets comprise a plurality of nozzles disposed on a ceiling of the aircraft cabin and a plurality of nozzles disposed under the storage bin and oriented to direct ventilation air toward the first exhaust inlet.

12. The ventilation system of claim 11, further comprising means for diffusing the flow of ventilation air through the pluarlity of nozzles disposed on the ceiling.

13. The ventilation system of claim 9, wherein an average velocity of the ventilation airflow in the cabin is less than 50 feet per minute and a miximum velocity of the ventilation airflow in the cabin is less than 65 feet per minute.

14. The ventilation system of claim 9 wherein at least 40 percent of the metabolic carbon dioxide generated by a passenger seated in the aircraft cabin is immediately vented outside the aircraft and is not recirculated into the supply air duct.

15. The ventilation system of claim 9 wherein air is discharged from the supply air duct into the cabin through a nozzle disposed proximate an upper surface of the storage bin and generally follows that surface downwardly into the cabin, and into the passenger seating area.

16. The ventilation system of claim 9 wherein substantially all the air drawn through the second exhaust inlet is recirculated back into the cabin.

17. In an aircraft cabin, a method for removing air contaminated by smoke and passenger metabolic exhalants while maintaining an airflow in the cabin that is stable and symmetrical about a central plane extending longitudinally through the cabin, comprising the steps of:
(a) supplying a pressurized ventilation airflow that includes both fresh air and recirculated air through one or more openings disposed generally above a passenger seating area in the cabin, and disturbing that airflow both downwardly and laterally within the cabin;
(b) drawing air from the cabin at a location where the air is heavily contaminated with smoke and passenger metabolic exhalants and venting the heavily contaminated air outside the cabin; and
(c) drawing from an area proximate the floor of the cabin, air that is relatively free of contaminants, and recirculating said relatively contaminant free air back into the cabin.

18. The method of claim 17 wherein the pressurized ventilation airflow is supplied from a duct disposed above an aisle extending adjacent the passenger seating area.

19. The method of claim 18 further comprising the step of supplying the pressurized ventilation airflow through a discharge nozzle disposed on a structure that extends inwardly from a wall of the cabin over the passenger seating area, the nozzle directing the ventilation airflow toward an exhaust port disposed adjacent said location where the air is heavily contaminated with smoke and metabolic exhalants, thereby sweeping said contaminated air toward the exhaust port so that it may be drawn therethrough and vented.

20. The method of claim 17 wherein the ventilation airflow is supplied the cabin through a nozzle disposed above a structure that extends inwardly from a wall of the cabin, over the passenger seating area, the ventilation airflow following a surface of the structure downwardly into the cabin.

21. The method of claim 17 wherein said location where the air is heavily contaminated with smoke and metabolic exhalants is partially defined by a structure extending inwardly from a wall of the cabin and disposed above the passenger seating area.

22. The method of claim 17 wherein ventilation air flows downwardly into a central aisle and laterally outward toward opposite walls of the cabin through a passenger seating area on each side of the aisle, substantially none of the ventilation air circulating back through the passenger seating area to flow upwardly at the aisle.

* * * * *

UNITED STATES PATENT AND TRADEMARK OFFICE
CERTIFICATE OF CORRECTION

PATENT NO. : 4,742,760

DATED : May 10, 1988

INVENTOR(S) : R.H. Horstman et al.

It is certified that error appears in the above-identified patent and that said Letters Patent is hereby corrected as shown below:

Column 1, line 60, "uppe" should be --upper--.
Column 1, Line 60, "ezone" should be --zone--.
Column 5, line 51, "attached" should be --attaches--.
Column 6, line 21, "dischrge" should be --discharge--.
Column 6, line 29, "comforatable" should be --comfortable--.
Column 6, line 53, "106" should be --206--.
Column 7, line 53, "84" should be --86--.
Column 7, line 68, "distributon" should be --distribution--.
Column 8, line 51, Claim 1, line 18, "direction" should be --directing--.
Column 9, line 16, Claim 7, line 3, "openign" should be --opening--.
Column 9, line 19, claim 7, line 5, "communiction" should be --communication--.
Column 9, line 68, Claim 12, line 3, "pluarlity" should be --plurality--.
Column 10, line 27, Claim 17, line 10, "disturbing" should be --distributing--.
Column 10, line 66, claim 22, line 6, "area" should be --areas--.

Signed and Sealed this

Twentieth Day of December, 1988

Attest:

DONALD J. QUIGG

*Attesting Officer*  *Commissioner of Patents and Trademarks*